Figure 1:
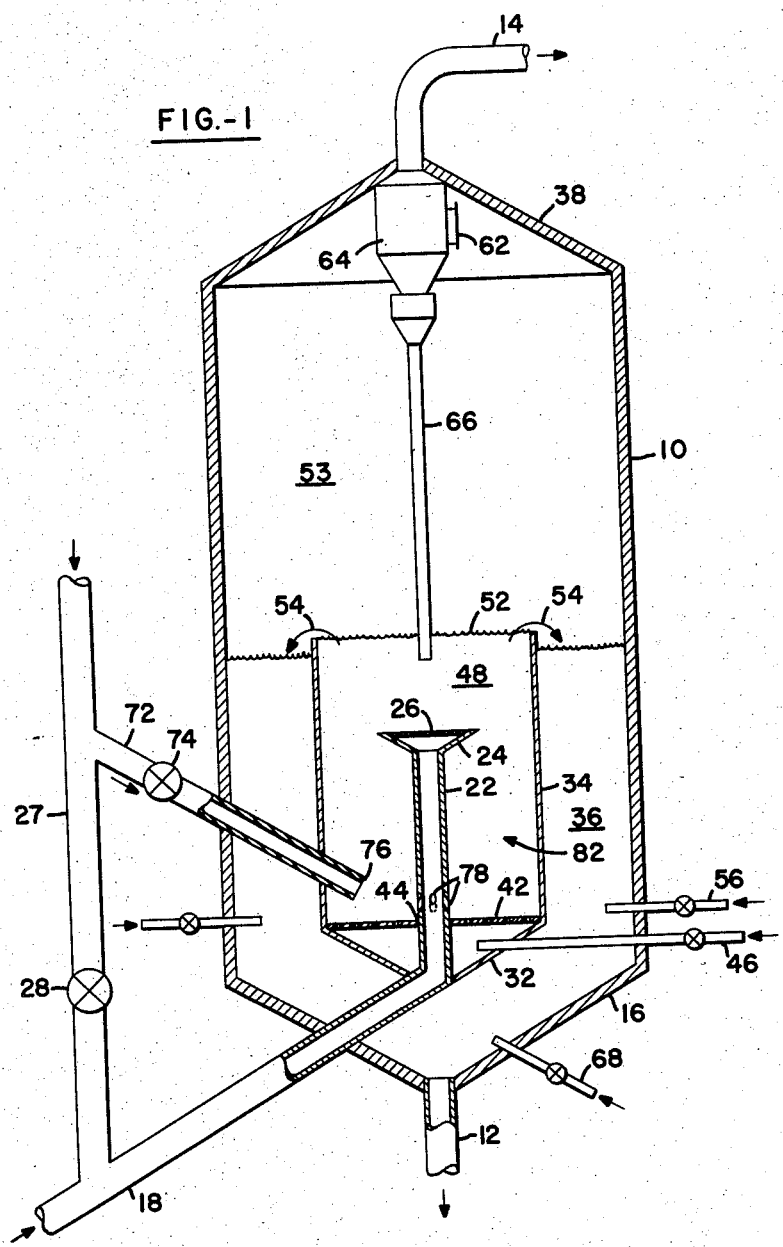

Aug. 9, 1960 — C. E. HEMMINGER — 2,948,673
CATALYTIC CRACKING OF HYDROCARBONS
Filed April 30, 1957 — 2 Sheets-Sheet 1

Charles E. Hemminger Inventor
Attorney

Aug. 9, 1960    C. E. HEMMINGER    2,948,673
CATALYTIC CRACKING OF HYDROCARBONS
Filed April 30, 1957    2 Sheets-Sheet 2

Charles E. Hemminger  Inventor

By *Beryl J Sieheny*  Attorney

United States Patent Office 2,948,673
Patented Aug. 9, 1960

2,948,673

CATALYTIC CRACKING OF HYDROCARBONS

Charles E. Hemminger, Westfield, N.J., assignor to Esso Research and Engineering Company, a corporation of Delaware Filed Apr. 30, 1957, Ser. No. 656,071

7 Claims. (Cl. 208—164)

This invention relates to the catalytic cracking of hydrocarbons and more particularly relates to the catalytic cracking of high boiling hydrocarbons such as heavy gas oil and residual oils such as deasphalted reduced crude oils. The present invention is also useful in the catalytic cracking of shale oils and the like.

When cracking high boiling oils such as heavy gas oils or reduced crude oils or the like, the coke or carbon deposits on the catalyst are high because of the nature of the oil feed. The larger amount of coke or carbon laid down on the catalyst as compared to lower boiling gas oils is a function of the Conradson carbon of the oil feed and results from the deposition of heavy asphalt-type materials which require longer time of cracking than the other portions of the oil feed. In the conventional cracking reactors, a large amount of uncracked hydrocarbon material is carried into the stripper and to the regenerator because sufficient time is not made available.

According to the present invention additional catalyst residence time is provided below the oil feed in a catalytic cracking reactor. In one form of the invention the oil feed is introduced into the catalyst bed in the reactor by means of a distributor approximately 10–25% of the bed height above the bottom of the bed. Additional soaking time for the catalyst is provided below the oil inlet region in a soaking section. Catalyst is circulated from the upper portion of the catalyst bed to the lower portion thereof. Thus, because the catalyst deposits are decreased by the cracking of the heavy hydrocarbons from the catalyst, the catalyst need not be circulated to the regenerator as frequently to restore the catalyst activity by removal of the deposits by burning.

In another form of the invention a small amount of hot regenerated catalyst is added to the region below the oil inlet feed to raise the temperature of the catalyst in the soaking section.

In another form of the invention a larger amount of the hot regenerated catalyst is introduced into the soaking zone in the region below the oil inlet to raise the temperature of the catalyst in the soaking zone and provision is made for recycling a portion of this hotter catalyst to the oil inlet line for recirculation to the catalyst bed. Here, catalyst activity maintenance by cracking away of catalyst deposits is accelerated by higher temperatures.

In the specific form of the invention the soaking zone below the oil feed inlet will be hotter because of the added regenerated catalyst at a higher temperature than the catalyst in the cracking zone and this hot regenerated catalyst will be mixed with the cooler catalyst from the upper portion of the catalyst bed and the absorbed heavy hydrocarbons on the catalyst will be subjected to a longer soaking time and higher temperature condition than in a conventional cracking zone or reactor and in this way the heavier hydrocarbons will be given more time for cracking down to volatile hydrocarbons and carbon or coke with corresponding short residence time of catalyst in contact with the oil feed.

In addition some of the catalyst after soaking is recontacted with the oil feed. By providing the additional soaking time for the catalyst following contact with the oil feed in the cracking zone, less coke or carbon is deposited on the catalyst and more $C_4$–430° F. gasoline is obtained. Less uncracked hydrocarbon material is carried to the stripping zone and to the regenerator than in conventional catalytic cracking because of the longer time of soaking of the catalyst with the absorbed heavy hydrocarbons thereon.

Figure 2:
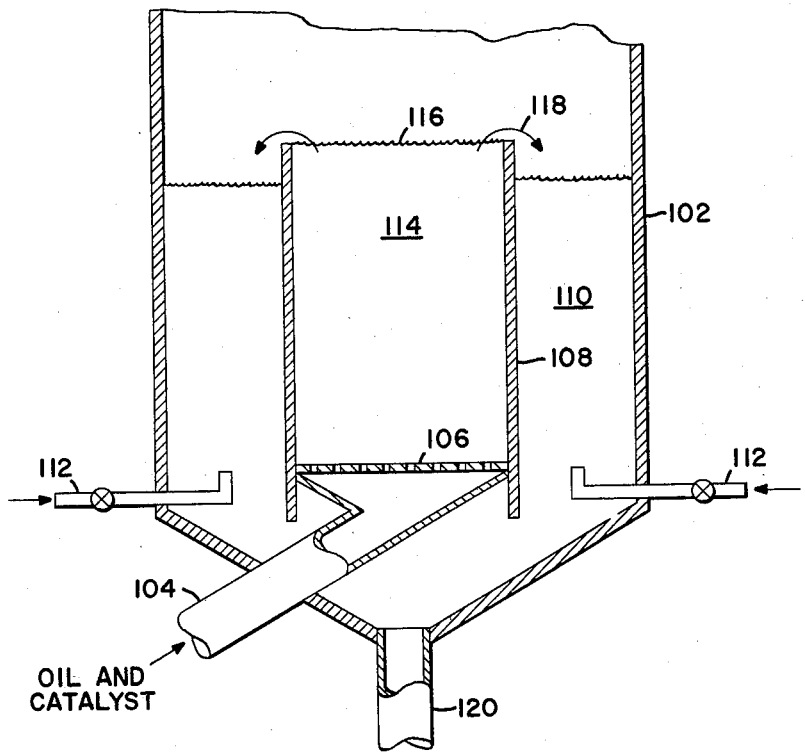

In the drawing;

Fig. 1 represents a vertical longitudinal cross sectional view of one form of apparatus adapted to carry out the present invention; and Fig. 2 represents a portion of one form of conventional apparatus used in the catalytic cracking of hydrocarbons.

Referring now to the drawing the reference character 10 designates a vertically arranged cylindrical reactor having a bottom outlet 12 for the withdrawal of spent catalyst particles and a top outlet 14 for removal of converted vaporous hydrocarbons. The bottom portion of the reaction vessel 10 is in the form of a conical base 16. An oil feed inlet line 18 extends at an angle through the bottom conical portion 16 into the vessel 10 and is provided at its inner portion with a vertically extending tube or pipe 22. The pipe or tube 22 is located centrally of and concentrically with the cylindrical vessel 10. The upper end of tube or pipe 22 is expanded as at 24 and the outlet upper end is provided with a perforated grid or distribution member 26.

A standpipe 27 having a valve 28 is provided for passing hot regenerated catalyst from a regeneration vessel (not shown) to the oil inlet line 18. The oil inlet line 18 at its inner end within the interior of reaction vessel 10 adjacent its junction with vertical tube 22 has an outwardly flared or a conical portion 32 which substantially parallels the bottom conical portion 16. Extending upwardly from the top of the expanded or conical section 32 is a cylindrical sleeve 34 which is smaller than the internal diameter of the reaction vessel 10 to leave an annular space 36 as a stripping zone or stripping section to be more fully described hereinafter. The sleeve 34 is sealed to the conical portion 32 and extends upwardly in the reaction zone 10 to a distance of about 20 to 50% of the height of the cylindrical portion of the reaction vessel 10 between the bottom conical portion 16 and the top conical portion 38.

At the junction approximately at the bottom of the cylindrical sleeve 34 and the expanded or conical section 32 of the inlet line 18 is a perforated grid or distribution member 42 which has a central opening 44 for receiving the vertical pipe or tube 22. Arranged below the distribution grid 42 is one or more lines 46 for introducing aeration gas below the grid 42 for passage therethrough into the interior of the cylindrical sleeve 34. The velocity of the upflowing gases through the cylindrical sleeve 34 is selected to form a dense turbulent fluidized mass or bed of solid particles shown at 48 and having a level indicated at 52. The dense fluidized solids overflow the top of the cylindrical sleeve 34 as shown by the arrows 54 into the stripping zone or section 36.

One or more gas lines or taps 56 are arranged at the bottom portion of the annular stripping section 36 for the introduction of a stripping gas such as steam to strip out volatile hydrocarbons from the spent catalyst particles leaving the dense fluidized bed 48. When using silica-alumina cracking catalyst having a particle size between about 0 and 100 microns with most of the particles being between about 20 and 80 microns and with a superficial velocity of the gas or vapor passing upwardly through the dense fluidized bed 48 between about 1.0 and 3.0 feet per second, the density of the dense fluidized bed mixture in the bed 48 will be between about 47 and 30 lbs. per cubic foot.

The hydrocarbons passing through the reaction zone or vessel are contacted with the catalyst and the cracked vaporous hydrocarbons pass upwardly through the dense fluidized bed 48. Above the level 52 of the dense fluidized bed 48 is a dilute phase 53 where there is only a small amount of entrained catalyst particles in the upflowing vapors. The vapors containing entrained catalyst particles are passed through opening 62 into a dust separator such as a cyclone separator 64 to separate most of the entrained solids from the cracked hydrocarbon vapors. The separated solids are returned to the dense fluidized bed 48 through dip leg 66 which extends below the level 52 of the dense fluid bed 48. The cracked vapors pass overhead from the cyclone separator 64 through outlet line 14 and are further processed to recover desired hydrocarbon products.

The temperature in the fluidized bed of catalyst particles 48 for the catalytic cracking of hydrocarbons such as gas oils or heavier hydrocarbon fractions is between about 880° F. and 990° F. From the annular stripping zone 36 the spent catalyst is passed into the outlet line 12 which may be a standpipe provided with a control valve for removing the spent catalyst from the reaction vessel 10 and for passing it into a regeneration vessel which may be similar to the reaction vessel 10 where the carbonaceous deposit is burned from the catalyst to regenerate the catalyst. The temperature during regeneration is between about 1050° F. and 1250° F. Aerating or stripping gas is introduced into the bottom conical section 16 of the reaction vessel 10 through one or more lines 68 to maintain the spent catalyst in fluidized form. The hot regenerated catalyst from the regeneration zone is introduced into the top of the standpipe 27 for introduction into the oil line 18.

According to the specific form of the present invention a part of the hot regenerated catalyst substantially at regeneration temperature is withdrawn from an intermediate portion of the standpipe 27 through line 72 having a valve 74 for controlling the amount of hot regenerated catalyst so withdrawn. The line 72 extends through the side vertical wall of the reaction vessel 10 and through the internal cylindrical sleeve 34 for introducing hot regenerated catalyst into the soaking zone at the bottom portion of the dense fluidized catalyst bed 48 below the grid 26 and above the grid 42. The outlet 76 of the line 72 is spaced intermediate the top and bottom of the vertical tube 22 but may be arranged nearer the bottom and nearer to grid member 42.

The catalyst is preferably conventional silica-alumina catalyst containing about 87% silica but the amount of alumina may range from about 13% to 40% by weight. Other catalysts may be used such as silica-magnesia, silica-alumina-magnesia, silica-alumina-zirconia, acid treated bentonite clays, etc.

The bottom wall portion of the vertical tube 22 just above the bottom distribution or grid member 42 is provided with a plurality of holes 78 arranged in a horizontal plane for providing communication between the soaking zone and the inside of vertical tube 22. To avoid bypassing of the oil vapors from tube 22 through the holes 78 into annular space 82 forming the lower part of fluidized bed 48, the holes 78 are directed upwardly at an angle of about 60° to the horizontal plane.

According to the present invention an apparatus and method are provided whereby longer stripping time or soaking time for the spent catalyst is provided and additionally hot regenerated catalyst may be added to a portion of the dense fluidized bed to increase the temperature during soaking of the catalyst particles containing insufficiently cracked residual hydrocarbons. The hydrocarbon oil to be cracked, which may be heavy gas oil, shale oil, oil from tar sands, deasphalted reduced crude oil, is preheated by heat exchange with flowing streams in the unit to a temperature between about 600° F. and 900° F. The preheated oil feed is then mixed with hot regenerated catalyst from a standpipe 27 at a temperature of about 1050° F. to 1250° F. and a sufficient amount of catalyst is added to at least partially vaporize the oil or sufficient in amount to form a vaporous or gaseous suspension of catalyst and oil droplets in the oil vapors in oil inlet line 18. The greater part of the cracking takes place in the inlet line 18 and vertical tube or pipe 22 where the catalyst in oil vapors suspension has a density of about 10 to 20 lbs. per cubic foot. The velocity of the suspension passing through line 18 is between about 50 and 200 feet per second.

After the suspension enters the cylindrical sleeve 34 its velocity is reduced and the dense fluidized turbulent catalyst bed 48 is formed. The annular space 82 around the vertical tube 22 below grid 26 is used as a soaking section to provide additional time for cracking the heavy hydrocarbons absorbed on the spent catalyst particles. During the main cracking operation, heavy residual hydrocarbons or high boiling hydrocarbons are absorbed by the catalyst and usually insufficient time is provided for cracking these higher boiling hydrocarbons down to volatile hydrocarbons and hence stripping is not as efficient as it should be and more hydrocarbons are sent to the regenerator where they are burned and form excessive heat therein.

As mentioned above, the vertical tube 22 is provided with the row of upwardly directed holes 78 at the bottom thereof just above the grid member 42 to permit recirculation of catalyst particles from the annular space 82 around the vertical tube 22 into the interior of the tube 22 where the catalyst oil suspension is normally hotter than in the annular soaking zone or space 82. In order to raise the temperature of the catalyst in the soaking zone 82, sufficient hot regenerated catalyst may be withdrawn from the standpipe 27 through line 72 and introduced by means of the outlet 76 into the lower portion of the dense fluidized bed in soaking zone 82. Sufficient hot regenerated catalyst is introduced by means of line 72 to raise the temperature of the soaking zone 82 to a temperature of about 20° F. to 100° F. higher than the temperature in the fluidized catalyst suspension passing through tube 22 which is between about 860° F. and 970° F.

In Fig. 2 there is shown a simplified form of conventional reactor where the vertical cylindrical vessel 102 has an inlet 104 for preheated oil and hot regenerated catalyst which is passed through the horizontal perforated or grid member 106 arranged near the bottom of a vertical cylindrical sleeve 108. The grid member 106 is in sealed relation with the vertical sleeve 108. Sleeve 108 is smaller in diameter than the cylindrical vessel 102 and is spaced therefrom to form an annular stripping section 110. Means for introducing a stripping gas such as steam are shown as lines 112 for introducing stripping gas into the bottom portion of the annular section 110.

In this form of device a temperature fluidized bed of catalyst 114 is maintained above the grid member 106 within the cylindrical sleeve 108. The dense fluidized bed 114 has a level indicated at 116 and the dense liquid-like catalyst overflows the top of the cylindrical sleeve 108 as indicated by arrows 118 for passage into the stripping section 110. The vessel 102 is provided with a catalyst outlet 120 for removing spent catalyst from the reactor and for passing it to a regeneration vessel (not shown). In the conventional form of apparatus shown in Fig. 2 the temperature of the dense fluidized bed 114 will be substantially uniform throughout the bed and insufficient time is provided in the stripping zone for breaking down of heavy residual hydrocarbons absorbed on the catalyst particles and for stripping volatile hydrocarbons from the spent catalyst before the catalyst is regenerated. As a result large amounts of coke or hydrocarbonaceous material are left on the catalyst and stripping is poor and hydrocarbons are lost by burning in the regeneration zone.

The present invention as shown in Fig. 1 as compared with the conventional bed in Fig. 2 has a longer time of soaking of the spent catalyst following a cracking step and furthermore improved results are obtained by adding hot regenerated catalyst to the soaking zone to raise the temperature of the catalyst particles to higher temperature to assist in cracking residual or high boiling hydrocarbons absorbed on the spent catalyst while giving a longer soaking time period. With the present invention a better product distribution is obtained and more gasoline is recovered from the same amount of oil feed.

To illustrate the heat balance in bed 48 and the oil and catalyst in tube 22, let us start with 100 lbs. oil fed to line 18 and 1000 lbs. catalyst withdrawn from line 12 and recirculated back to the reactor through line 27 from the regenerator operated at about 1050–1100° F. to give 920° F. reactor temperature in the conventional operations as in Fig. 2. Introduction of 200 lbs. of additional catalyst through line 76 raises the temperature in bed 48 to 945° F., 25° F. higher than the mixture in tube 22.

When holes 78 are placed in tube 22, the flows are adjusted so that for the same 100 lbs. of oil, only 800 lbs. of catalyst are introduced through line 18 and 400 lbs. of catalyst are introduced through line 76. The temperature of the bed 82 then is increased to 970° F. while maintaining the 920° F. for the outlet mixture from tube 22 by having about 600 lbs. of catalyst circulating through the holes 78.

In a specific example, referring first to the conventional form of cracking unit shown in Fig. 2, the catalyst to oil weight ratio was about 8.9 using finely divided silica-alumina catalyst and mixed Louisiana gas oil of 29.3° API, 432° F. initial, 50% at 689° F. and 80% at 746° F. and diesel index of 55.9, and with the cylindrical sleeve 108 about 22 feet in diameter and about 12 feet high above the grid member 106, the temperature of the dense fluidized bed 114 was about 921° F. About 21 tons of catalyst were present in the cylindrical sleeve 108. The amount of oil fed through line 104 was about 35,400 barrels per day. The distance from sleeve 108 to the vertical wall of vessel 102 was about 1 foot. The temperature in the stripping zone 110 was about 921° F. and the amount of steam at a temperature of 494° F. introduced through lines 112 was about 9,875 lbs. per hour. The spent catalyst being withdrawn through line 120 had about 0.9% carbon by weight of oil feed thereon. The time of residence in stripping section 110 is about 50 seconds.

According to one form of the invention used for comparison in connection with Fig. 1 the fluidized catalyst inside tube or cylinder 22 has a temperature of about 920° F. Assuming the same catalyst holdup within the cylindrical sleeve 34 in Fig. 1 and the same amount of the same type oil fed into line 18 and reducing the catalyst-to-oil ratio of the mixture passing through line 18 to 7 and supplying additional hot regenerated catalyst from line 72 to increase the catalyst-to-oil ratio to 10 higher than the 8.9 ratio used in connection with the example above given in connection with Fig. 2, the temperature in the annular soaking zone 82 surrounding the vertical central pipe 22 will be about 940–945° F. where the temperature of the catalyst introduced through line 72 is at a temperature of 1050–1100° F.

The rate of circulation of catalyst from the dense fluidized soaking zone 82 through openings 78 into the vertical tube 22 is about 440 tons per hour and as the temperature in the soaking zone 82 is higher by 20–25° F. than the catalyst suspension passing upwardly through the vertical tube 22, heat is added to the suspension passing up through tube 22. The amount and temperature of the stripping steam introduced through lines 56 into the annular stripping section 36 are substantially the same as those used in the example given in connection with Fig. 2.

Because of the higher temperature within the soaking zone 82, the temperature during stripping will also be increased. Also because of the longer soaking time provided for in the soaking zone 82, less coke or carbonaceous material will be deposited on the catalyst which is withdrawn as spent catalyst through line 12. The time of soaking hot spent catalyst in the soaking zone 82 in this specific example is about 2.0 minutes as compared to a soaking time of 0.8 minute in the example given in connection with Fig. 2. The amount of coke on the spent catalyst withdrawn through line 12 is about 0.7% by weight of the oil feed. In the specific example, the sleeve 34 has a height of 13 feet, a diameter of 22 feet, reactor 10 has a diameter of 24 feet and a height of the cylindrical portion from conical bottom 16 to conical top 38 of 30 feet. Vertical tube 22 has a diameter of 16 feet and a height above grid 42 of 10 feet, so that the grid 26 is about 3 feet below the top of sleeve 34.

According to the example of the present invention more cracking of the hydrocarbon oil is obtained and there is less coke or carbonaceous material on the catalyst withdrawn through line 12. In addition more $C_4$ to 430° F. gasoline is recovered in the example given in connection with the present invention.

Operation according to:

|  | Fig. 1 | Fig. 2 |
|---|---|---|
| 430° F. conversion, v. percent | 52.3 | 52.3 |
| Coke, weight percent | 4.1 | 4.7 |
| Gas, weight percent | 6.4 | 6.5 |
| $C_4$, v. percent | 8.3 | 8.3 |
| $C_5$–430°, v. percent | 39.6 | 38.9 |
| 430° F.+, v. percent | 47.7 | 47.7 |

In another form of the invention, the hot regenerated catalyst is passed from standpipe 27 into line 18 and none of the hot regenerated catalyst is introduced into the bottom portion of the cylindrical sleeve 36 above grid 42 through the line 72 leading from the regenerated catalyst standpipe 27. Then, the reduction in coke is due only to the additional soaking time in bed 82 and no temperature differential is enjoyed. In this form of the invention the holes 78 are not provided and no catalyst circulation between bed 82 and mixture in cylinder 22 is provided.

The amount of catalyst particles introduced into the soaking zone 82 through line 72 may be between about 0% and 50% of the total regenerated catalyst being introduced into the reaction zone in sleeve 34.

By merely increasing the soaking time of the spent catalyst according to the present invention to about 2.0 minutes as compared to about 0.8 minute in Fig. 2, the amount of coke on the spent catalyst withdrawn from line 12 of Fig. 1 is about 0.8% by weight on the oil feed as compared to about 0.9% coke by weight on the oil feed on the spent catalyst withdrawn from line 120 in Fig. 2 for the feed stocks indicated. With heavier feeds, such as residual oils and heavy gas oils, etc., having a Conradson carbon in the order of 3%, the reduction is from 1.50 to 1.20% carbon on spent catalyst, a reduction of 20% of coke formed on fresh feed. Of course, the relative holding times and temperatures can be adjusted by different designs of the unit and catalyst-to-oil ratios to increase the residence time in the bed 82.

It is significant that a portion of the catalyst circulates from bed 82 through holes 78 to cylinder or tube 22 without flowing into stripper 36. Due to the residence time of 1–2 minutes in bed 82 wherein 20–40% of the coke is cracked from the catalyst, this circulated catalyst has greater activity than the spent catalyst passing through grid 26. Consequently, the space velocity as pounds of oil per pound of catalyst in tube 22 is increased 10 to 30%, say from 4 to 4.5 w./hr./w.

In the present invention the time of soaking of the spent catalyst in soaking zone 82 may be between about 1.0 and 5.0 minutes and the temperature in soaking zone 82 may be between about 900° F. and 1000° F.

The w./hr./w. (weight of oil per hour per weight of catalyst) in tube 22 may be between about 1.0 and 6.0.

While a specific design of appaartus and specific examples of process operation have been given, it is to be understood that these are by way of illustration only and as not limiting the invention.

What is claimed is:

1. An apparatus of the character described including a cylindrical vessel having a top gaseous outlet and vertically arranged and having a conical bottom portion provided with a bottom outlet for solids, a cylindrical sleeve concentric with and smaller than the diameter of said vessel to leave an annular space, means for introducing solids and gasiform material to said sleeve, said sleeve extending up only part way of said vessel, a grid member secured horizontally in the bottom of said sleeve, said means including an inlet line extending into said vessel and through the center of said grid member into said sleeve as an inner vertical line, said inner vertical line being much smaller in diameter than said sleeve and concentric therewith and having its open upper end at a lower level than the top of said sleeve, means for providing a gas space below said grid member, means for introducing fluidizing gas into said gas space for passage upwardly through said grid member, the outlet end of said inner vertical line being provided with a horizontally arranged perforated distribution member, and standpipe means for passing solids to said vessel including a line for passing solids to said inlet line and a branch line for passing solids to the bottom portion of said sleeve above said grid member.

2. An apparatus of the character described including a cylindrical vessel having a top gaseous outlet and vertically arranged and having a conical bottom portion provided with a bottom outlet for solids, a cylindrical sleeve concentric with and smaller than the diameter of said vessel to leave an annular space to receive solids from said sleeve, means for introducing gasiform material and solids to said sleeve, said sleeve extending up only part way of said vessel, a grid member secured horizontally in the bottom of said sleeve, said means including an inlet line extending into said vessel and through the center of said grid member into said sleeve as an inner vertical line, said inner vertical line being much smaller in diameter than said sleeve and concentric therewith and having its open upper end a short distance below the top of said sleeve, means for providing a gas space below said grid member, means for introducing fluidizing gas into said gas space for upward passage through said grid member, the outlet end of said inner vertical line being provided with a horizontally arranged perforated distribution member, said inner vertical line being provided with openings at its lower end but above said grid member for recirculating solids from the lower portion of said sleeve to the interior of said inner vertical line for upward passage therethrough.

3. An apparatus of the character described including a cylindrical vessel having a top gaseous outlet and vertically arranged and having a conical bottom portion provided with a bottom outlet for solids, a cylindrical sleeve concentric with and smaller than the diameter of said vessel to leave an annular space to receive solids from said sleeve, means for introducing gasiform material and solids to said sleeve, said sleeve extending up only part way of said vessel, a grid member secured horizontally in the bottom of said sleeve, said means including an inlet line extending into said vessel and through the center of said grid member into said sleeve as an inner vertical line, said inner vertical line being much smaller in diameter than said sleeve and concentric therewith and having its open upper end a short distance below the top of said sleeve, means for providing a gas space below said grid member, means for introducing fluidizing gas into said gas space for upward passage through said grid member into said sleeve, the outlet end of said inner vertical line being provided with a horizontally arranged perforated distribution member, said inner vertical line being provided with openings at its lower end but above said grid member for recirculating solids from the lower portion of said sleeve to the interior of said inner vertical line for upward passage therethrough and standpipe means for passing solids to said inlet line and including a branch line for passing solids to the bottom portion of said sleeve above said grid member.

4. A method for the catalytic cracking of residual hydrocarbon oil feeds which comprises introducing such oil and hot regenerated catalyst as a confined stream passing upwardly through a portion of a fluidized bed of catalyst in a cracking zone and having an opening discharging into the upper portion of said dense turbulent fluidized bed in said cracking zone a short distance below the upper level of said dense fluidized bed, passing cracked vapors upwardly through the upper portion of said dense fluidized catalyst bed, removing cracked hydrocarbon vapors from above said dense fluidized catalyst bed, passing spent catalyst from the upper portion of said fluidized catalyst bed to the lower portion thereof below the region of oil feed and catalyst introduction and into a soaking zone surrounding said confined stream for permitting soaking of said spent catalyst particles containing high boiling absorbed hydrocarbons to crack them to lower boiling hydrocarbons, introducing hot freshly regenerated catalyst as a separate stream to the lower portion of said soaking zone to increase the temperature therein, recycling some of the spent soaked catalyst particles and said regenerated catalyst from said soaking zone into said confined stream of oil and catalyst upstream from said opening but within the lower portion of said fluidized catalyst bed for passage upwardly through said confined stream into the upper portion of said fluidized bed of catalyst in said cracking zone, overflowing spent catalyst from the upper portion of said fluidized bed into a separate stripping section surrounding said fluidized bed, and withdrawing stripped catalyst from the bottom of said stripping zone.

5. An apparatus of the character described including a vertically arranged cylindrical vessel having a top outlet and having a conical bottom portion provided with a bottom outlet for solids, a cylindrical sleeve in said vessel and concentric with and smaller than the diameter of said vessel to leave an annular space between said sleeve and the wall of said vessel, said sleeve extending up only part way of said vessel, a grid member secured horizontally in the bottom portion of said sleeve, means for introducing solids and gasiform material into said sleeve and including an inlet line extending into said vessel and through the center of said grid member into said sleeve as an inner vertical line which is much smaller in diameter than said sleeve and concentric therewith and having its open upper end at a lower level than the top of said sleeve, means for providing a gas space below said grid member, means for introducing fluidizing gas into said gas space for passage upwardly through said grid member, the outlet end of said inner vertical line being provided with a horizontally arranged perforated distribution member, and standpipe means for passing solids to said vessel including a line for passing solids to said inlet line and a branch line for passing solids to the bottom portion of said sleeve above said grid member, said vertical inner line being provided with openings at its lower end but above said grid member for recirculating solids from within the lower portion of said sleeve to the interior of said vertical inner line for upward passage therethrough.

6. A method for the catalytic cracking of high boiling hydrocarbon oil feeds which comprises passing a mixture of hydrocarbon oil and freshly regenerated catalyst particles as an upwardly flowing confined stream submerged in a dense fluidized bed of catalyst particles in a cracking zone and discharging said mixture of oil and catalyst particles upwardly into said fluidized bed but at a short distance below the upper level of the dense fluidized bed, passing hydrocarbon vapors upwardly through the dense fluidized catalyst bed, removing cracked hydrocarbon vapors from above said dense fluidized catalyst bed, circulating spent catalyst from the upper portion of said fluidized catalyst bed to the lower portion thereof below the region of oil-catalyst mixture discharge into a soaking zone in the absence of added oil feed to increase the time of soaking of the spent catalyst particles and to increase the amount of cracking of residual high boiling hydrocarbons absorbed on said catalyst particles, introducing hot freshly regenerated catalyst particles into said soaking zone in the lower portion of said fluidized catalyst bed below the region of oil-catalyst mixture discharge to increase the temperature of the spent catalyst particles in said soaking zone to effect faster removal of residual high boiling hydrocarbons absorbed on said cracking catalyst, passing spent catalyst particles from the dense fluidized bed into an annular stripping zone surrounding said cracking zone and stripping the spent catalyst particles to remove volatile cracked hydrocarbons therefrom.

7. A method for the catalytic cracking of high boiling hydrocarbon oil feeds which comprises introducing such oil and finely divided catalyst as a vertical confined stream passing upwardly through the lower portion of a fluidized bed of catalyst in a confined cracking zone and having an opening discharging into an upper portion of said dense fluidized bed in said cracking zone a short distance below the upper level of said dense fluidized bed, passing cracked vapors upwardly through the upper portion of said dense fluidized catalyst bed, removing cracked hydrocarbon vapors from above said dense fluidized catalyst bed, circulating spent catalyst particles from the upper portion of said fluidized catalyst bed to the lower portion thereof into a soaking zone surrounding the lower portion of said confined stream for permitting soaking of said spent catalyst particles containing high boiling absorbed hydrocarbons to crack them to lower boiling hydrocarbons, introducing hot freshly regenerated catalyst into the lower portion of said soaking zone below the region of oil-catalyst mixture discharge to increase the temperature of the spent catalyst particles in said soaking zone to effect faster removal of hydrocarbons from said catalyst particles, recycling some of the spent soaked catalyst particles and regenerated catalyst particle mixture from the lower portion of said soaking zone into the lower portion of said confined stream of oil-catalyst mixture and upstream from said opening but within said fluidized catalyst bed and removing spent catalyst particles from the upper portion of said dense fluidized bed of catalyst in said cracking zone and stripping the removed catalyst particles before regenerating them and returning them to said dense fluidized bed of catalyst through said vertical confined stream.

References Cited in the file of this patent

UNITED STATES PATENTS

| | | |
|---|---|---|
| 2,383,636 | Wurth | Aug. 28, 1945 |
| 2,399,050 | Martin | Apr. 23, 1946 |
| 2,490,798 | Gohr et al. | Dec. 13, 1949 |
| 2,556,514 | Bergstrom | June 12, 1951 |
| 2,612,433 | Nicolai et al. | Sept. 30, 1952 |
| 2,652,317 | Rees et al. | Sept. 15, 1953 |
| 2,702,267 | Keith | Feb. 15, 1955 |
| 2,791,547 | Beiswenger | May 7, 1957 |
| 2,885,343 | Woebcke | May 5, 1959 |